Dec. 12, 1967   B. DETALLE   3,357,260
FLUID SYSTEM FOR MEASURING IMPULSES
Filed July 15, 1964
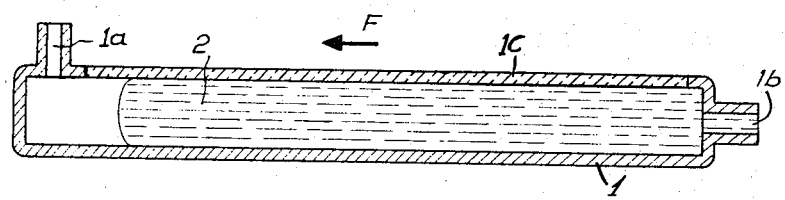
Fig. 1
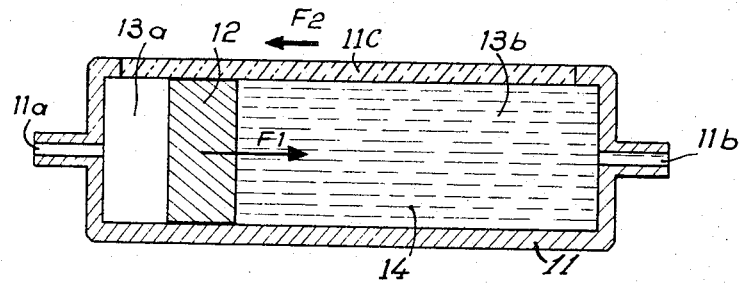
Fig. 2
Fig. 3
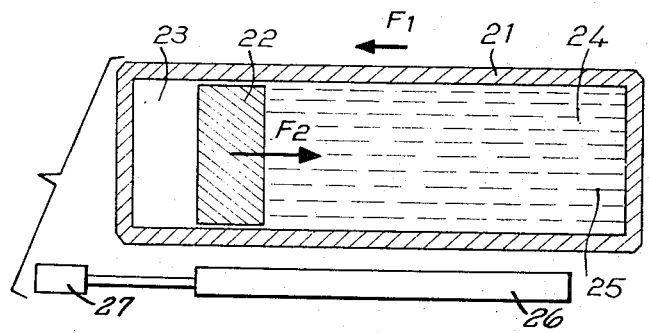
Inventor
Bernard Detalle
By: Stevens, Davis, Miller & Mosher
Attorneys United States Patent Office 3,357,260
Patented Dec. 12, 1967

3,357,260
FLUID SYSTEM FOR MEASURING IMPULSES
Bernard Detalle, Villemomble, France, assignor to Societe d'Etude de la Propulsion Reaction, Villejuif, Hauts-de-Seine, France, a French company
Filed July 15, 1964, Ser. No. 382,868
4 Claims. (Cl. 73—503)

The invention relates to the field of measuring and particularly to the measuring of mechanical impulses.

Many industrial and research problems require the rapid and accurate measurement of mechanical impulses. Such a condition exists, for example, for the measurement of the performance of an internal combustion engine or of the impulse produced by a rocket motor, or by the acceleration of a moving body. The term "impulse" is here used in its exact scientific sense and is represented by the product of an applied force and the time during which it is applied, or by the time integral of the applied force.

It is well known to cite one example of this requirement, that the successful launching of a rocket requires the precise determination of the impulse which must be generated in order to permit the vehicle to attain the speed required in order to strike its target. This determination is generally difficult to obtain when it is carried out prior to launching, for example by accurately measuring the quantities of fuels introduced, despite the care and precautions taken.

It is therefore an object of this invention to produce an accurate indication of the impulse generated by a power source.

It is another object thereof to produce such indication instantaneously.

A further object of the present invention is to produce such an indication using simple and rugged means.

Yet another object of the invention is to produce an accurate indication of the time integral of the acceleration of a moving body.

The magnitude of an impulse may be determined by integrating, with respect to time, a quantity proportional to the applied force over the time during which it is applied.

The process according to the present invention is characterized in that the force to be integrated is applied to a fluid housed in an enclosure, the fluid thus being placed under pressure, and the quantity of fluid flowing through at least one orifice during a certain period of application of the force is measured, this quantity being proportional to the time integral of the force applied during the measuring period.

The means conceived for carrying out the process of this invention are characterised in that they comprise, in combination: an enclosure, containing a fluid; means for applying a pressure to the fluid under the action of the force or pressure whose impulse is to be measured, at least one outlet orifice for the fluid; and means for measuring the quantity of fluid passing through the orifice during the measuring interval.

These and other objects, features and advantages of the present invention will become more readily apparent from the following description and associated drawings, in which:

FIG. 1 is a longitudinal cross sectional view of one embodiment of the present invention.

FIGS. 2 and 3 are longitudinal cross-sectional views of two other embodiments of this invention.

Turning now to FIG. 1, there is shown a hollow cylindrical enclosure 1 which is closed at both ends and which is furnished, in its cylindrical wall at one end, with a radial orifice 1a and, in its other end, with a longitudinal orifice 1b. Cylinder 1 has a small internal diameter and is partially filled with a liquid medium 2, which could, for example, be mercury.

If the quantity to be measured is in the form of a pressure, orifice 1a can be connected by appropriate tubing (not shown) to the pressure source (also not shown); this pressure will act on the fluid 2, causing a quantity thereof to flow through the orifice 1b.

This orifice will have a diameter which is suitably calibrated to produce the desired amplitude of response to an applied pressure. On the other hand, if it is desired to measure the acceleration of a moving body, the cylinder 1 will be rigidly connected to the body in question with its longitudinal axis parallel to the direction of the acceleration to be measured, indicated by arrow F. Orifice 1a may be opened to the atmosphere, and the inertia of fluid 2, under the influence of the acceleration, will cause a portion thereof to flow through calibrated orifice 1b. In this case, the instantaneous rate of flow will be proportional to the instantaneous acceleration and the quantity of flow will be proportional to the time integral of the acceleration, or to the differential velocity of the body.

The measurement of the quantity of liquid flowing through orifice 1b may be effectuated by any known means, such as by a weighing scale or an integrating liquid flow meter.

FIG. 2 shows a variation of the embodiment of FIG. 1 in which a hollow cylindrical enclosure 11, which could have a larger internal diameter than the cylinder 1 of FIG. 1, is partially closed at both ends and is furnished, at each end, with longitudinal orifices 11a and 11b, respectively. The cylinder houses a piston 12 which is constructed so as to slide longitudinally therewithin while maintaining an impermeable contact with the internal cylindrical wall thereof. Piston 12 divides the interior of cylinder 11 into two chambers 13a and 13b one of which, 13b, is filled with a fluid 14 which is preferably incompressible in nature.

As in the case of the FIG. 1 device, if a pressure is to be measured, appropriate tubing may be used to connect the pressure source to orifice 11a to permit applied pressure to urge piston 12 in the direction of arrow F1. If the acceleration is to be measured, orifice 11a may be left open to the atmosphere and the cylinder will be oriented so that it points in the direction of the acceleration to be measured, as indicated by arrow F2.

In either case, the reading desired may be obtained by the measurement of the quantity of liquid flowing through orifice 11b by any suitable means. The quantity of liquid flowing through orifice 11b may also be determined by a measurement of the distance travelled by piston 12. This measurement may be accomplished visually by making a longitudinal section of cylinder 11 transparent and by placing scale graduation thereon, or it may be accomplished electrically by making piston 12 of a ferromagnetic material and determining its location by any known magnetic field producing and sensing means.

FIG. 3 shows still another embodiment of the present invention in which a hollow cylinder 21 is constructed so as to be closed at both ends and so as to have its interior completely isolated from the outside. On the interior of this cylinder, there is provided a piston 22 having a diameter which is slightly smaller than the internal diameter of the cylinder. This piston divides the cylinder interior into two chambers 23 and 24, the former being initially empty and the latter being initially filled with a fluid 25, which is preferably incompressible in nature.

The annular space between piston 22 and the cylindrical wall of cylinder 21 is provided to permit the passage of liquid 25 from chamber 24 to chamber 23 and is suitably calibrated so as to permit the desired rate of fluid flow in response to a given force exerted by cylinder 22 in the direction of arrow F2.

The device of FIG. 3 functions only in response to accelerations and is employed by rigidly mounting cylinder 21 on a moving body whose acceleration is to be measured. The longitudinal axis of the cylinder is oriented so as to be aligned with the direction F1 of the acceleration to be sensed.

In operation, the piston 22 moves in the direction of arrow F2 as an acceleration in the direction F1 causes the force exerted by the piston to drive liquid 25 through the annular orifice around the piston from chamber 24 to chamber 23. The rate of flow of liquid 25, and hence the rate of movement of piston 22, will thus be proportional to the acceleration experienced by the unit and the total displacement of piston 22 will therefore be proportioned to the time integral of this acceleration.

The measure of the quantity of liquid which has passed from one chamber to the other can then be determined by measuring the total travel of piston 22 by any appropriate means, such as those discusssed above in connection with FIG. 2.

It may thus be seen that the present invention provides simple and rugged means for measuring the impulse of a force; i.e., the time integral of a force or a force produced acceleration, by the simple technique of measuring the quantity of liquid flowing through an orifice during the measuring interval.

Such means could very easily be used to control the impulse delivered to a body by simply coupling the force producing means to the measuring system so that the application of the force will be terminated when a predetermined quantity of fluid has flowed through the outlet orifice or when the piston reaches a predetermined position.

This latter operation could be easily achieved, for example by placing a magnetic field producing and sensing unit 26, 27 adjacent the cylinder in such a position that the sensing unit 27 produces a maximum signal when the piston reaches a predetermined position, the signal being produced by the concentration of the magnetic field in the ferromagnetic piston material. Then sensing unit output could then be used to control the shut-off of the force generating device.

While several embodiments of the present invention have been shown and described herein it should be appreciated that many variations and modifications would occur to one skilled in the art without departing from the spirit of the present invention and that the coverage of his invention should therefore be limited only by the scope of the present claims.

I claim:
1. A device for measuring the time integral of a force comprising a hollow cylinder, a body of incompressible fluid within said cylinder, a calibrated orifice in one base of said cylinder in contact with said fluid within said cylinder, means for applying force to said fluid within said cylinder including a second orifice arranged in the vicinity of the other base of said cylinder and through which said force applying means transfers a force to said fluid, whereby fluid will flow through said calibrated orifice at a rate proportional to said force, and means connected with said calibrated orifice for measuring the quantity of fluid displaced through said calibrated orifice by said force applying means during a predetermined time interval.

2. A device as recited in claim 1 wherein there is provided a piston slidably disposed in said cylinder between said second orifice and said fluid.

3. A device as set forth in claim 2 wherein said piston comprises a ferromagnetic material.

4. A device as set forth in claim 3 wherein said measuring means comprises a magnetic field producing and sensing means.

References Cited

UNITED STATES PATENTS

| | | | |
|---|---|---|---|
| 2,404,179 | 7/1946 | King | 73—516 X |
| 2,556,803 | 6/1951 | Eckman | 73—206 |
| 2,603,726 | 7/1952 | McLean | 73—503 X |
| 2,659,589 | 11/1953 | Hickman | 73—516 X |
| 2,958,137 | 11/1960 | Mueller | 73—516 X |
| 2,960,871 | 11/1960 | Ganther et al. | 73—503 X |
| 2,974,529 | 3/1961 | Bruggeman et al. | 73—503 |
| 2,997,883 | 8/1961 | Wilkes | 73—503 |
| 3,008,334 | 11/1961 | Lees | 73—503 |
| 3,137,175 | 6/1964 | Jamgochian | 73—503 |

FOREIGN PATENTS

| | | |
|---|---|---|
| 131,184 | 8/1919 | Great Britain. |
| 844,514 | 7/1952 | Germany. |
| 126,627 | 8/1960 | Russia. |

JAMES J. GILL, *Primary Examiner.*

RICHARD C. QUEISSER, *Examiner.*